H. E. WINSLOW.
MOTOR VEHICLE.
APPLICATION FILED MAR. 1, 1919.
1,348,385.
Patented Aug. 3, 1920.
4 SHEETS—SHEET 2.
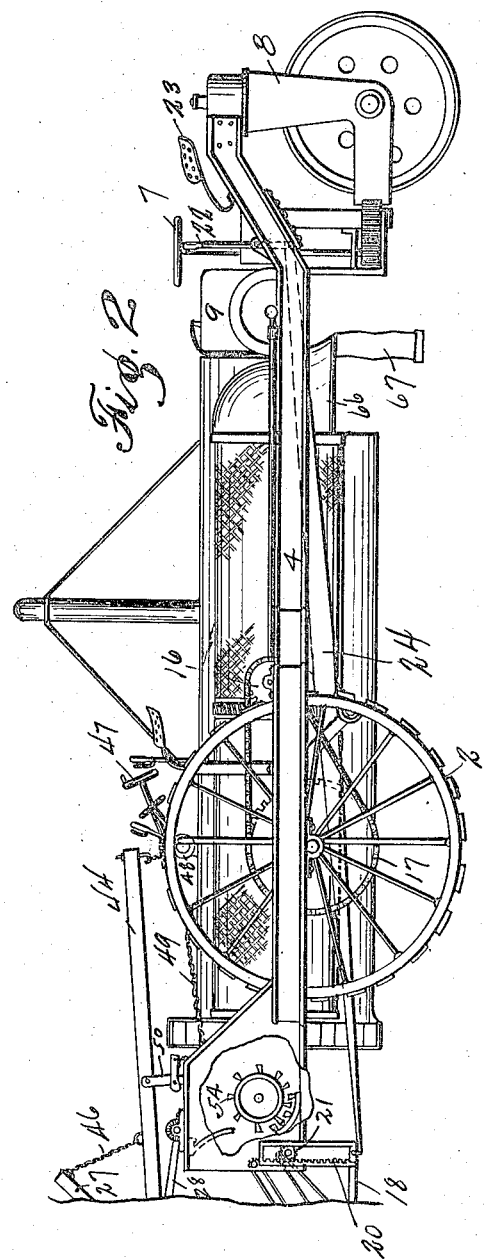
Inventor
Hardin E. Winslow
By
Herbert E. Smith
Attorney

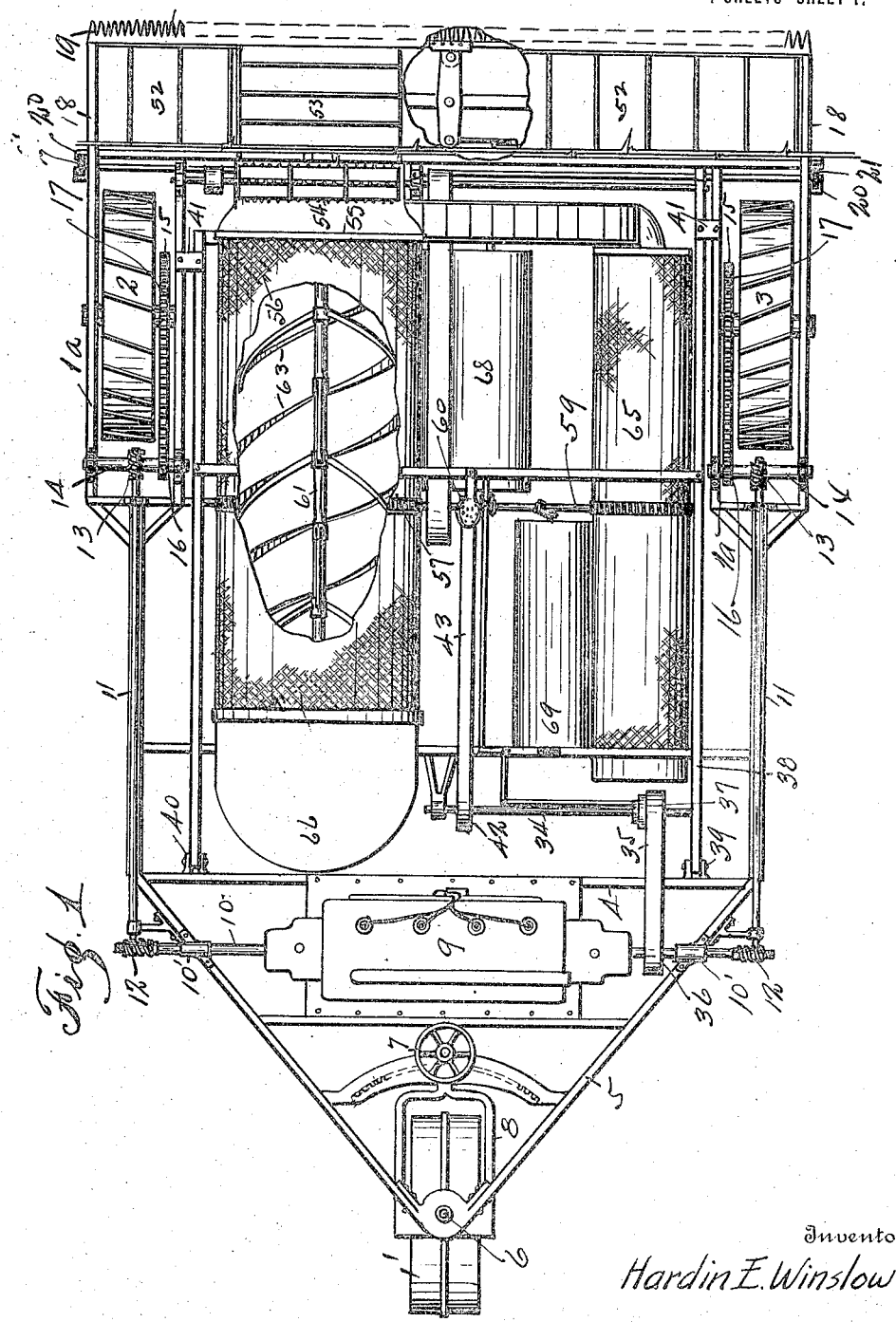

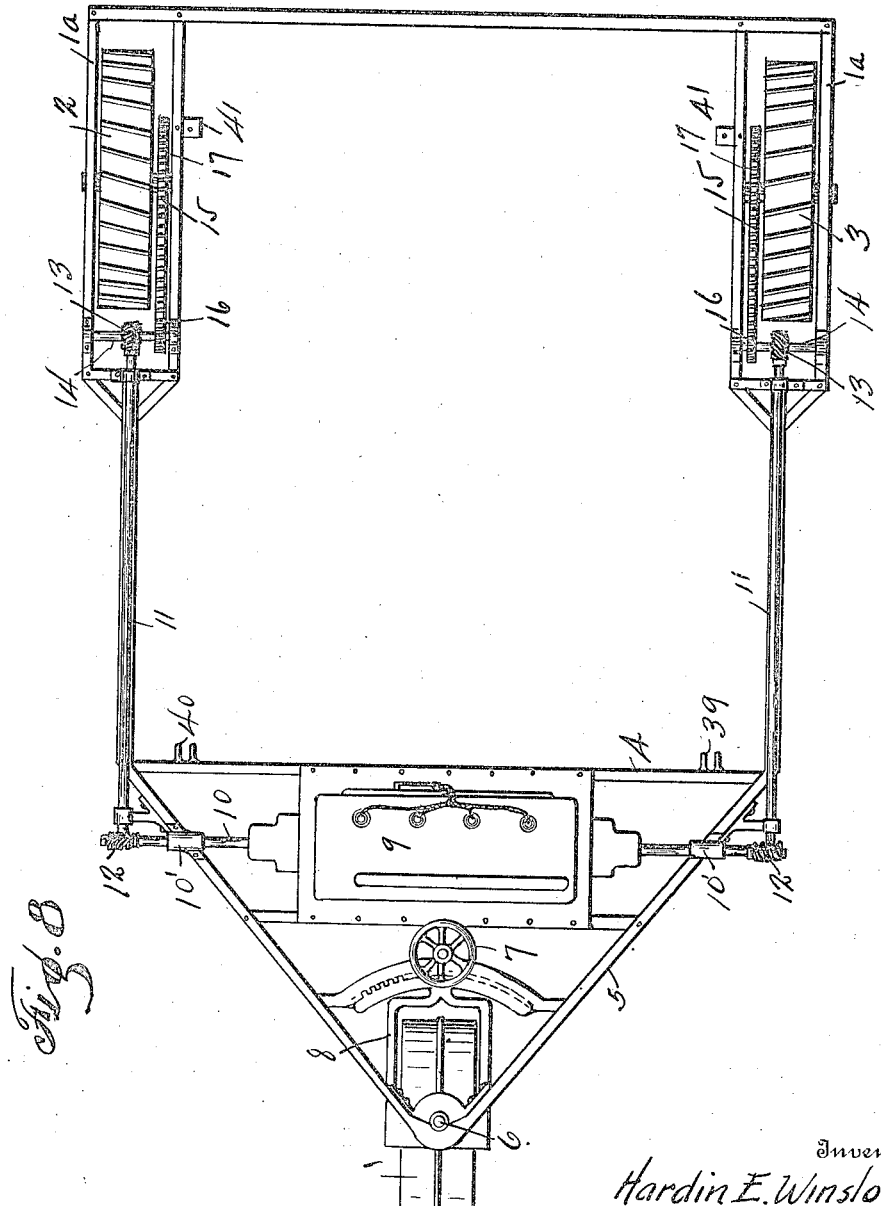

UNITED STATES PATENT OFFICE.

HARDIN E. WINSLOW, OF SPOKANE, WASHINGTON, ASSIGNOR OF ONE-FOURTH TO ROLLA C. WISNER, OF SPOKANE, WASHINGTON.

MOTOR-VEHICLE.

1,348,385.　　　　　　Specification of Letters Patent.　　Patented Aug. 3, 1920.

Application filed March 1, 1919. Serial No. 280,105.

*To all whom it may concern:*

Be it known that I, HARDIN E. WINSLOW, a citizen of the United States, residing at Spokane, in the county of Spokane and State of Washington, have invented certain new and useful Improvements in Motor-Vehicles, of which the following is a specification.

The present invention relates to improvements in motor vehicles, designed especially for use as convertible implements for farm use, wherein the vehicle may be transformed from the usual form of truck, into a harvester, or a hay rack, or a platform may be applied to the truck frame to convert the tractor into a vehicle for hauling material, etc.

The primary object of the invention is the provision of an implement adapted for several uses about a farm, which may be quickly and conveniently converted for use, and which specifically embodies a harvester or harvesting implement and adjustable features and elements therein, by means of which the implement may be operated.

In the accompanying drawings one complete example of the physical embodiment of the invention is illustrated, a combined harvester being shown built according to the best mode so far devised for the practical application of the principles of the invention.

Figure 1 is a plan view of an implement involving a combined harvester, and embodying the invention.

Fig. 2 is a side elevation of the implement of Fig. 1, the sickle and header reel being omitted for convenience of illustration.

Fig. 3 is a side elevation of the forward part of the harvester, showing the header reel and sickle portions omitted from Fig. 2.

Fig. 4 is a detail of the header adjusting mechanism.

Fig. 8 is a top plan view of the truck with the superstructure removed.

Figure 5:
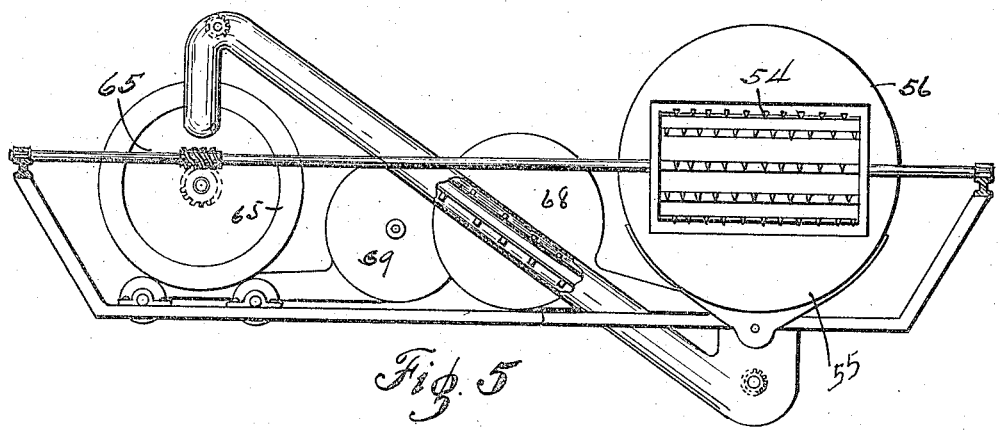
Fig. 5 is a view taken transversely of the implement showing in end elevation the grain cleaning devices.
Figure 6:
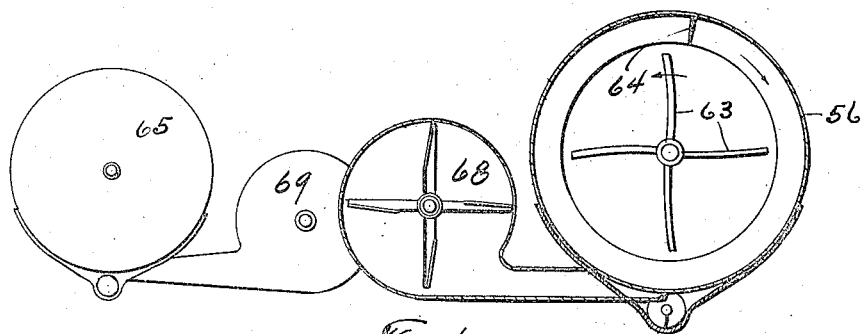
Fig. 6 is a transverse sectional view of the main screen and cleaning screen.
Figure 7:
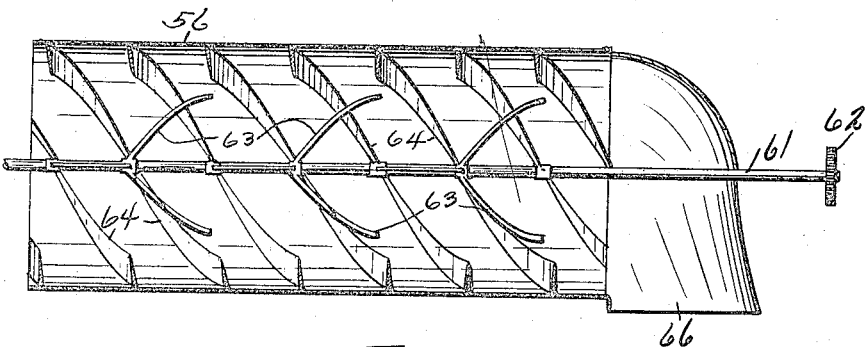
Fig. 7 is a longitudinal sectional view of the main grain screen.

In the preferred form of the invention as illustrated in the drawings the implement is supported upon three wheels, the wheel designated as 1 being the rear and steering wheel, while the two forward side wheels 2 and 3 are the traction wheels, of larger diameter than the steering wheel, and journaled in the rectangular frame 4. At the rear of the rectangular frame, the bars 5 converge to form a bearing for the spindle 6 of the steering wheel and the wheel is turned or steered by using the hand wheel 7 and its yoke 8.

The vehicle is propelled by the prime mover 9 which may be an electric motor or gasolene engine having the main driving shaft 10 arranged transversely of the implement in bearings 10′, to drive the two countershafts 11, 11, arranged longitudinally of the implement and at each side of the main rectangular frame 1, in which frame these countershafts are journaled. A worm gear connection is indicated at 12 12 between the drive shaft and the countershafts, and additional worm gear connections are indicated at the front ends of the countershafts, at 13 13 for the sprocket shafts 14 14.

The two sprocket shafts are stub or short length shafts journaled, transversely of the implement at the rear of the traction wheels, in the wheel supporting frames 1ª, and by means of the sprocket chain 15, the sprocket wheel 16 and sprocket wheel 17 these traction wheels are driven as will be understood, to propel the vehicle either as a truck or as a converted agricultural implement as shown herein.

At the front of the implement is located the supplemental frame 18 for the usual cutter bar 19, the frame or platform 18 being adjustable as to its altitude through the instrumentality of the vertical rack bar 20 and the pinion 21, these parts being duplicated at the sides of the implement. Thus the header may be adjusted by moving the lever 22, located adjacent the seat 23 and convenient for the driver, and connected by the long link or bar 24 which extends from rear to front of the implement as seen in Fig. 2.

In order that the proper action of the grain may be accomplished in connection with the sickle or cutter 19, the reel 25 is also adjustable toward or away from the sickle, and for this purpose said reel is journaled through its shaft 26 in the two side bars 27 27 and driven from the driving shaft 28 through the gears 29, 30 and the gear shaft 31 with its pinions 32 33.

The reel actuating shaft 26 is operated from the prime mover and its driving shaft from the transverse countershaft 34 operated from the driving shaft by belt 35 and the respective pulleys 36 and 37 on the driving and countershafts. The countershaft is journaled in the supplementary frame 38 which carries and supports the mechanism of the harvesting implement, and this frame is coupled at 39 40 to the rear of the rectangular truck frame, and at 41 41 near the front of the main truck frame. The supplementary frame with its equipment may thus be detached from the truck frame or with equal facility be attached thereto, and several of these supplementary frames may be utilized as parts of the implement accessories so that the different mechanisms or devices carried by the frames may be applied to the truck or tractor by the simple expedient of attaching or detaching the supplementary frame to the tractor frame in Fig. 8.

From the countershaft 34, power may be transmitted to the different mechanisms of the implement by the pulley 42 and belt 43 as seen in Fig. 1.

The side arms 21 form a supporting frame which is pivoted on the driving shaft 26, and this supporting frame is adjustable, through its extension 44 which forms a lever with the shaft 26 as the fulcrum, and shaft 26 is also a pivotal point for the frame, the short arm 45 of the frame being connected by the chain 46 to the lever 44 whereby the frame may be adjusted with relation to the lever on the shaft. The lever is actuated by turning the hand wheel 47 which revolves the drum 48 to wind the chain 49 attached to one arm of the bell crank lever 50 that is pivoted at 50' in a rigid support and has its other arm pivotally connected to the lever 44.

The hand wheel is located adjacent the driver's seat where it is convenient for manipulation, so that turning the wheel to the right causes the drum to wind the chain which passes under a pulley 51 and pulls on the bell crank lever to draw down the arm 44, swing the frame 27 on its shaft, and thus lift the reel at desired position.

After being cut down by the sickle bar 19 the grain, straw, etc., are carried by the transverse drapers 52 and carrying draper 53 to the usual threshing cylinder 54 (Fig. 2) and immediately at the rear of the threshing cylinder, with its mouth 55 open to receive the grain is a rotary conveyer screen 56 revolved through the toothed ring 57 and pinion (not shown), the former extending around the screen and the latter actuated from the transverse shaft 59 that is driven from the belt 43 through pulley 60. Within this rotary screen is located the shaft 61 having the gear or pinion 62 revolved from the machine, and the arms or beaters 63 on the shaft are designed to beat the grain as it passes through the screen and keep the straw in motion. Around the interior walls of the rotary screen are arranged spiral blades 64 spaced suitable distance apart, and forming conveyer passages through which the grain is conveyed as it drops from the straw. These blades prevent the grain being blown into piles along the walls of the conveyer, and also insure a comparatively long passage through the screen during which passage the grain may be freed from dust, dirt, etc., and is then conveyed to the cleaner screen 65. Upon the rear end of the screen 56 is a hood 66 for deflecting the straw as it comes out of the screen so that it falls to the ground, and a canvas shield 67 extending below the hood to prevent the straw from flying around and may be interfering with the steering mechanism of the tractor or implement.

Both the rotary screen or main screen 56 and the second cleaner screen 65 have fans as 68 and 69 respectively to blow out the dust and hold the grain straws elevated or in suspension and prevent its packing against the screen structure to clog the openings in the reticulated walls of the screens.

Claims:

1. The combination in a tractor of an open rectangular frame having attaching means for receiving and supporting a superstructure, and a pair of side traction wheels journaled in said frame, of a rear V-shape frame and a steering mechanism and wheel supported therein, a motor supported on the V-shape frame, and means for transmitting power from said motor to the traction wheels.

2. The combination in a tractor of a rectangular frame and attaching means for supporting a superstructure, of front longitudinally open wheel frames at the sides of the rectangular frame and traction wheels journaled in the wheel frames, a rear V-shape frame attached to the rectangular frame and steering mechanism and a steering wheel supported therein, a motor having a transversely extending main shaft supported on the V-frame, a pair of longitudinal shafts on the main frame and gear connections between the main shaft and the longitudinal shafts, and driving mechanism for the traction wheels actuated from these longitudinal shafts.

3. The combination in an agricultural implement including an open rectangular main frame, and a rigid rear frame and steering mechanism, a motor carried by the rear frame, traction wheels in the main frame and driving connections from the motor to the traction wheels, and coupling members carried within and at the rear part of the open rectangular frame, and a superstructure including a supplementary frame detachably coupled to said coupling members and carrying mechanisms as described.

In testimony whereof I affix my signature.

HARDIN E. WINSLOW.